(12) United States Patent
Carson et al.

(10) Patent No.: US 6,469,549 B2
(45) Date of Patent: Oct. 22, 2002

(54) APPARATUS AND METHOD FOR ODD INTEGER SIGNAL DIVISION

(75) Inventors: Michael Carson, Cupertino; Dat Nguyen, San Jose, both of CA (US)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 09/727,840

(22) Filed: Nov. 30, 2000

(65) Prior Publication Data

US 2002/0063587 A1 May 30, 2002

(51) Int. Cl.[7] ............................................. H03K 21/00
(52) U.S. Cl. ........................ 327/115; 327/117; 327/377; 327/47
(58) Field of Search .................................. 327/115, 113, 327/117, 118, 107, 198, 175; 377/47

(56) References Cited

U.S. PATENT DOCUMENTS

| | | | |
|---|---|---|---|
| 4,891,825 A | 1/1990 | Hansen | 377/52 |
| 5,127,036 A | 6/1992 | Pham | 377/47 |
| 5,304,938 A | 4/1994 | Gregory et al. | 328/15 |
| 5,390,223 A * | 2/1995 | Lindholm | 327/115 |
| 5,410,683 A | 4/1995 | Al-Khairi | 395/550 |
| 5,442,670 A * | 8/1995 | Shu | 327/113 |
| 5,526,391 A * | 6/1996 | Shankar et al. | 377/118 |
| 5,963,071 A | 10/1999 | Dowlatabadi | 327/175 |
| 6,009,139 A * | 12/1999 | Austin et al. | 327/115 |
| 6,057,719 A * | 5/2000 | Austin et al. | 327/117 |

FOREIGN PATENT DOCUMENTS

JP 57-7634 * 1/1982

OTHER PUBLICATIONS

Mitel Semiconductor technical document entitled, "Very Low Phase Noise Synthesiser Divider," Apr. 1994, 5 pages.

* cited by examiner

Primary Examiner—Timothy P. Callahan
Assistant Examiner—Linh Nguyen
(74) Attorney, Agent, or Firm—Fish & Richardson P.C.

(57) ABSTRACT

The present invention provides a method and/or circuit for achieving a near 50 percent duty cycle divide-by-odd-integer output of an input reference clock.

22 Claims, 3 Drawing Sheets

US 6,469,549 B2

APPARATUS AND METHOD FOR ODD INTEGER SIGNAL DIVISION

FIELD OF THE INVENTION

The present invention is related to the field of electronic circuits. More particularly, the present invention is related to digital signal processing and generating an odd integer division signal from an input reference signal.

BACKGROUND OF THE INVENTION

A number of situations arise where an output signal is desired that has a period that is based on, and longer than, an input clock signal. Circuits or logic routines that perform this task are often called "frequency division circuits," or "divide-by circuits." Division by an even integer is an easily solved problem, and a number of circuit implementations are known. A single clocked register with feedback, for example can perform a divide-by-2 function of an input square wave signal. Division by other even integers can be accomplished with a number of such registers arranged as a shift register, where the output of the shift register can be used for division by powers of two and a combination of outputs from various stages of the shift register can be used for division by even integers that are not powers of 2.

Providing a divide-by function based on an odd integer, however is a much more difficult problem. Conventional division techniques result in a divided output with a non-50 percent duty cycle or are generally limited in terms of the divided signal that they can produce. One of the inventors of the present invention, for example, used a circuit similar to that shown in FIG. 1 in an earlier product sold by another company. This circuit provided a divide-by-three circuit only, and could not perform frequency division for higher odd integers.

From the preceding, it will be seen that there is yet no easily achievable and expandable or flexible circuit for providing a clock signal that is an odd integer division of an input signal.

SUMMARY

The present invention provides a method and/or circuit that achieves an expandable, near-50 percent duty cycle, divided-by-N circuit where N is an odd integer.

Using the teachings provided herein, it will be understood by those of skill in the art, that the methods and apparatus of the present invention could be advantageously used in a wide variety of situations requiring odd integer frequency division, such as communication systems, disk-drive controllers or other I/O circuits, general DSP applications, etc.

In particular embodiments, the invention can be understood as comprising a chain or shift register of delay elements having five groups. A first group delay element receives inverted feedback from the fifth group delay element. A second group comprises N chained delay elements, where N is any positive integer greater than or equal to two. A middle group delay element has an inverted clock. A fourth group comprises N−1 chained delay elements. A final group delay element provides the inverted feedback. According to the present invention, the output of the first group and the output of the middle group are combined to provide the divided-by output.

The invention will be better understood with reference to the following drawings and detailed descriptions. In different figures, similarly numbered items are intended to represent similar functions within the scope of the teachings provided herein. In some of the drawings and detailed descriptions below, the present invention is described in terms of the important independent embodiment of a multimedia message system. This should not be taken to limit the invention, which, using the teachings provided herein, can be applied to other data accessing situations.

Furthermore, it is well known in the art that logic systems can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in this specification. All publications, patents, and patent applications cited herein are hereby incorporated by reference in their entirety for all purposes.

DETAILED DESCRIPTION OF SPECIFIC EMBODIMENTS

Figure 1:
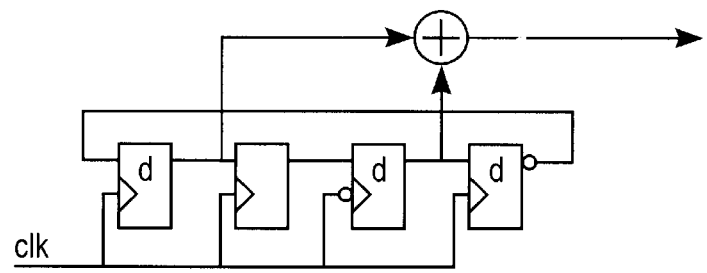
FIG. 1 shows a circuit embodiment of an earlier divide-by-3 circuit.
Figure 2:
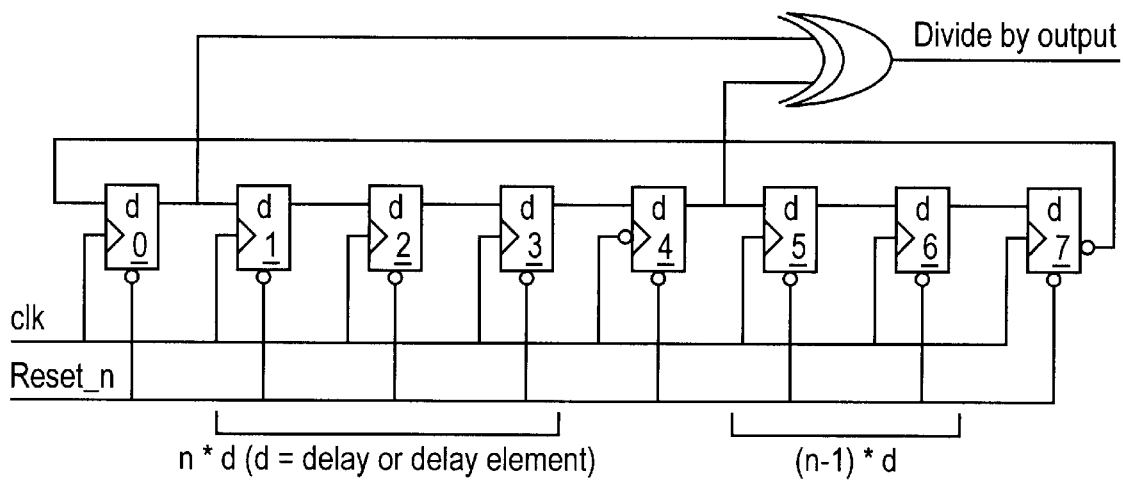
FIG. 2 shows a circuit embodiment of a divide-by-7 circuit according to particular embodiments of the invention.

FIG. 2 shows a circuit embodiment of a divide-by-7 circuit according to particular embodiments of the invention. The circuit shown in FIG. 2 performs a 50 percent divide-by-7 operation on the input signal CLK to achieve the output signal output. As shown in the figure, the main elements of the circuit comprise eight delay elements, such as digital logic flip-flops, arranged in a shift-register-like configuration. Shown in the figure are shift-registers labeled d1, d2, d3, d4, d5, d6, d7, and d0.

As illustrated in FIG. 2, the inverted output of d7 is fed back as an inverted feedback input to the data input of d1, d1 output is the input for d2, the d2 output is the input for d3, the d3 output is the input for d4, the output for d4 is the input of d5, the output of d5 is the input of d6, the output of d6 is the input of d7, and the output of d7 is the input of d0. As seen in the figure, there is a common clock CLK to each of the delay elements except that the middle delay element d4 is clocked with an inverted CLK signal.

Figure 3:
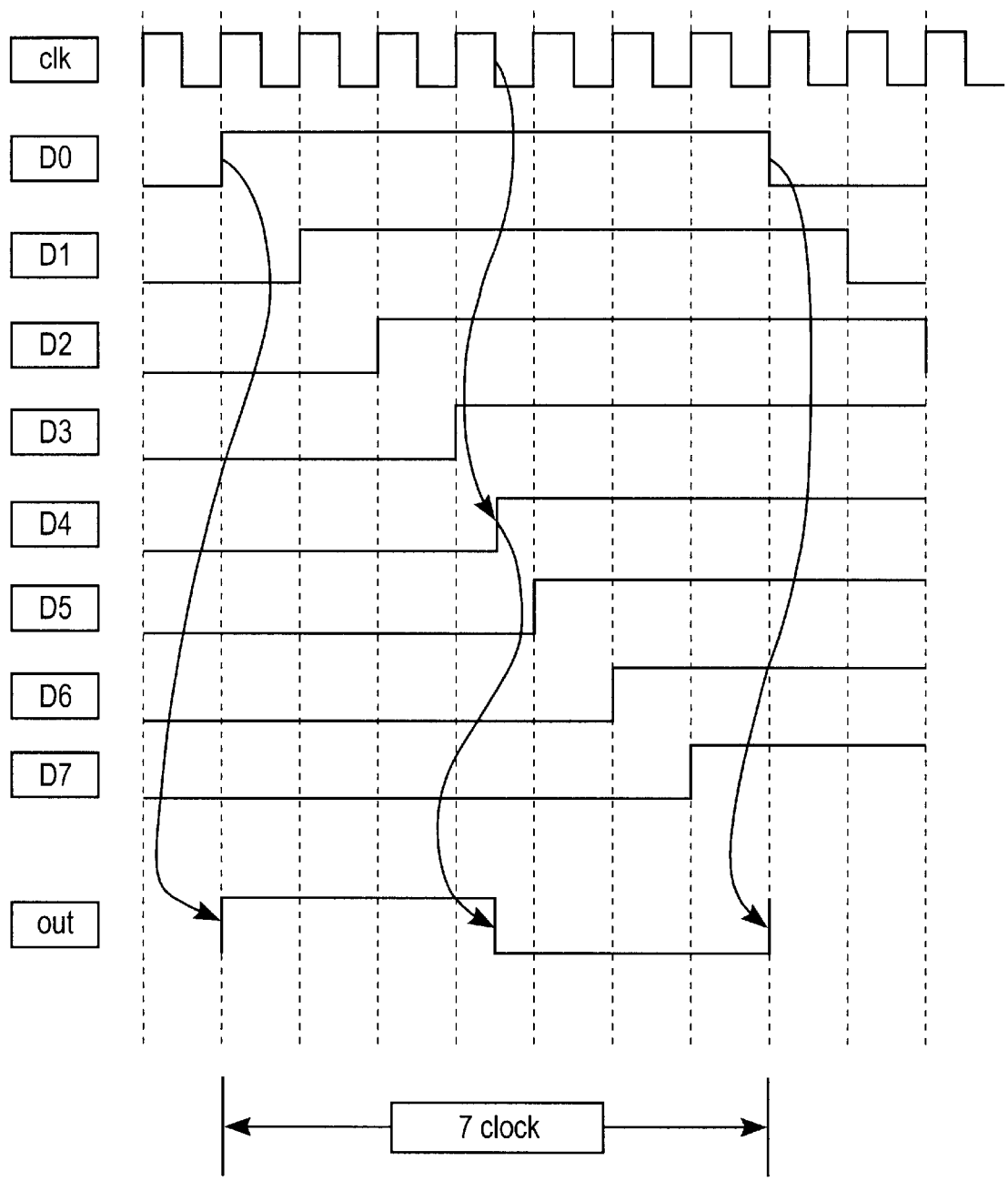
FIG. 3 is an example timing diagram of the circuit shown in FIG. 2.

The circuit configuration in FIG. 2 provides the outputs as shown in FIG. 3. As seen in both figures, the ultimate divided-by-7 output results from the inverted XOR of the outputs of d0 and d4, thus producing a glitchless 50 percent duty cycle divided-by-7 output of the input signal CLK.

Figure 4:
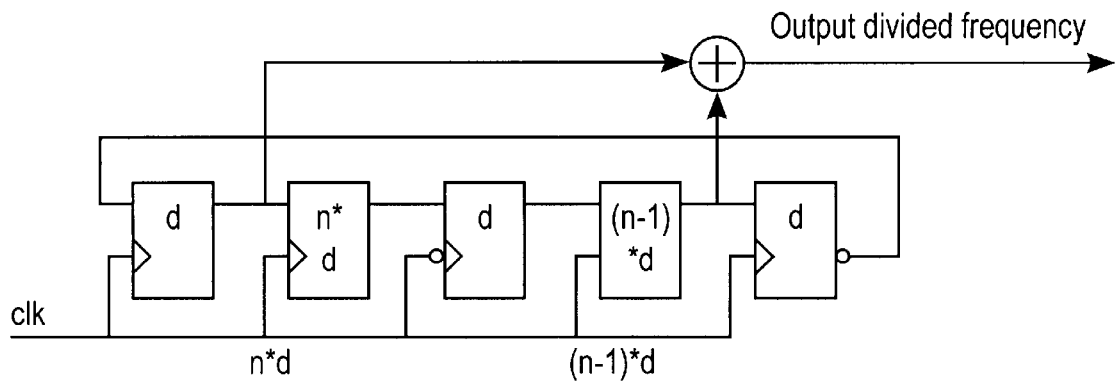
FIG. 4 shows a generalized circuit diagram for an expandable odd integer division circuit.

FIG. 4 shows a more generalized and expandable circuit for performing a divide-by-odd-integer function. FIG. 4 illustrates a general case expansion of a divide-by to provide a divide-by-X, where X=(N)2+1. d in the figure indicates a delay element or a delay element reference period. N can be any whole positive integer greater than 2.

Thus, with n=2, a frequency division of 5 is achieved; and with n=3, a frequency division of 7 is achieved. Likewise, n=4, would provide a frequency division of 9, and so on.

In one embodiment, the delay elements can be understood as digital logical flip-flops, other types of delay element can be used in a configuration as illustrated according to various embodiments of the invention.

Further understanding of the operation of embodiments of the invention can be understood by considering that the shift register as shown circulates an alternating pattern because of the inversion in the feedback loop. By tapping the circulating pattern in the appropriate places and combining them, a glitchless 50 percent duty cycle divide-by-odd-integer output signal may be derived.

The input reference frequency is provided as the common clock (CLK) frequency as shown in the figures. In particular embodiments, a common reset input is used to reset the entire chain to a known state. The output provided is very close to a 50% duty cycle, though if the reference frequency of the input slightly varies in the duty cycle, the duty cycle of the output will not be exactly 50%.

Figure 5:
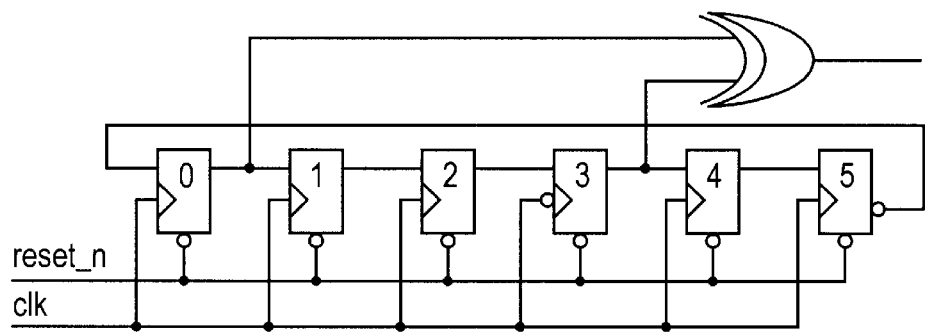
FIG. 5 shows a further example divide-by-5 circuit according to particular embodiments of the invention.

FIG. 5 shows a further example divide-by-5 circuit according to particular embodiments of the invention.

Furthermore, as will be apparent from the teachings provided herein, according to specific embodiments, the present invention provides some rejection of duty cycle variation in the input clock. With greater divide-by divisors, variations in the duty cycle of the input clock will be diluted roughly proportional to the amount of the division.

Furthermore, as will be apparent from the teachings provided herein, according to specific embodiments, the present invention provides a "glitchless" clock generation due to the operation of the XOR gate operated as a Graycode because only one of the input changes at any time so that by design the operation of the XOR output is effectively glitchless.

Further, the simplicity of the designs allows for very fast operation with no speed bottleneck in the divide-by circuit.

Embodiment in a Programmed Information Appliance

Figure 6:
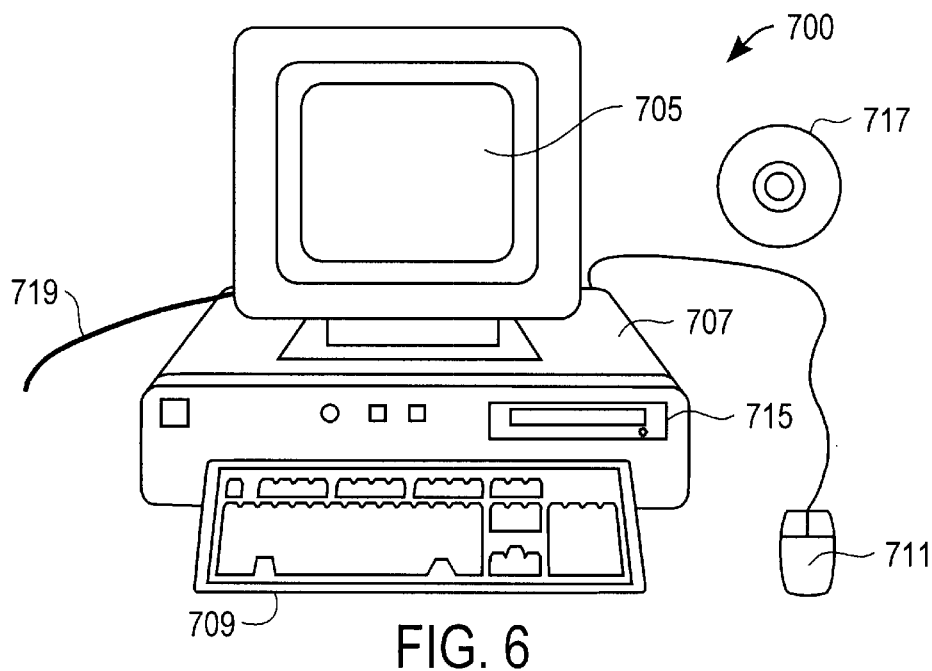
FIG. 6 shows an information processing device that can embody aspects of the present invention.

FIG. 6 shows an information processing device that can embody aspects of the present invention. The invention can be implemented in hardware and/or software. In some embodiments of the invention, different aspects of the invention can be implemented in either client-side logic or a server-side logic. As will be understood in the art, the invention or components thereof may be embodied in a fixed media (and/or transmissible) program component containing logic instructions and/or data that when loaded into an appropriately configured computing device cause that device to perform according to the invention.

FIG. 6 shows an information appliance (or digital device) 700 that may be understood as a logical apparatus that can read instructions from media 717 and/or network port 719. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media, magnetic tape, solid state memory, etc. The invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

Other Embodiments

The invention has now been described with reference to specific embodiments. Other embodiments will be apparent to those of skill in the art. In particular, a user digital information appliance has generally been illustrated or described as a personal computer. However, the digital computing device is meant to be any device for handling information could include such devices as a digitally enabled television, cell phone, personal digital assistant, etc.

Furthermore, while the present invention has been described using particular logic elements, it will be understood from the teachings provided herein that many alternative configurations, using Boolean substitutions or other substitutions as known in the art, are also within the purview of the invention. The invention also may be embodied in systems using digital signal processing through software, with no physical circuit elements.

It is understood that the examples and embodiments described herein are for illustrative purposes only and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed is:

1. A circuit for performing odd integer division with a near 50 percent duty cycle comprising:
   a staged serial circuit containing (2*N)+2 clocked delay elements with feedback from a final delay element to the input of an initial delay element and where N is an integer greater than or equal to two;
   a shared input clock supplied to each of said delay elements, with a clock input of at least one delay element inverted; and
   a function combining outputs of at least two of said delay elements to produce a divide-by-odd-integer signal derived from said shared input clock.

2. The device according to claim 1 wherein said outputs comprise:
   an output of said initial delay element and an output of another delay element.

3. The device according to claim 1 wherein said outputs comprise:
   an output of said initial delay element and an output of said delay element with an inverted clock.

4. The device according to claim 1 wherein said feedback is inverted.

5. The device according to claim 1 wherein said function is an XOR function.

6. The device according to claim 1 wherein said clock input that is inverted is provided to a middle delay element.

7. The device according to claim 1 further comprising a reset input providing common reset of each of said delay elements.

8. A method of providing odd integer signal divisions with an odd integer divisor of five or greater using a chain of delay stages comprising:

providing a first group of delay stages, said first group receiving a feedback from a last group delay stage;

providing a second group of delay stages comprising N chained delay stages, where N is a positive integer greater than or equal to two;

providing a middle group delay stage with an inverted clock input;

providing a fourth group of N−1 delay stages; providing a final group delay stage that generates said feedback;

combining an output of said first group and an output of said middle group to provide a desired divided-by output; and providing an input signal as a common clock to said delay stages.

9. The method according to claim 8 wherein N is selected to be equal to integer result of one-half of the desired divide-by integer.

10. The method according to claim 8 wherein said feedback is inverted.

11. The method according to claim 8 further comprising: providing a common reset to said delay stages.

12. A circuit for performing odd integer division with a near 50 percent duty cycle comprising:

a first group comprising a clocked delay stage, receiving as input a feedback output of a last group delay stage;

a second group comprising two clocked delay stages, each receiving as input output of a previous stage;

a third group comprising a clocked delay stage, receiving as input an output of a previous stage and having a clock offset from other stages;

a fourth group comprising one clocked delay stage, receiving as input an output of a previous stage;

a fifth group comprising a feedback delay stage the output of which provides to said first group;

a combiner, combining at least the output of said first group and said third group to produce a divided-by signal of a reference signal.

13. The device according to claim 12 further comprising: a first path for providing a common clock signal to each delay stage.

14. The device according to claim 12 further comprising: a second path for providing a common reset signal to each delay stage.

15. The device according to claim 12 wherein an output of said combiner is a divide-by-five periodic signal of an input reference signal applied to said first path.

16. A circuit for performing odd integer division with a near 50 percent duty cycle comprising:

a first group comprising a clocked delay stage, receiving as input a feedback output of a last group delay stage;

a second group comprising two clocked delay stages, each receiving as input output of a previous stage;

a third group comprising a clocked delay stage, receiving as input an output of a previous stage and having a clock offset from other stages;

a fourth group comprising one clocked delay stage, receiving as input an output of a previous stage;

a fifth group comprising a feedback delay stage the output of which provides to said first group;

a combiner, combining at least the output of said first group and said third group to produce a divided-by signal of a reference signal; and wherein said second group and said fourth group each comprise one additional clocked delay stage and wherein an output of said combiner is a divide-by-seven periodic signal of an input reference signal applied to said first path.

17. The device according to claim 16 further wherein:

said second group and said fourth group each comprise one additional clocked delay stage and wherein an output of said combiner is a divide-by-nine periodic signal of an input reference signal applied to said first path.

18. A circuit for performing odd integer division with a near 50 percent duty cycle comprising:

a first group comprising a clocked delay stage, receiving as input a feedback output of a last group delay stage;

a second group comprising two clocked delay stages, each receiving as input output of a previous stage;

a third group comprising a clocked delay stage, receiving as input an output of a previous stage and having a clock offset from other stages;

a fourth group comprising one clocked delay stage, receiving as input an output of a previous stage;

a fifth group comprising a feedback delay stage the output of which provides to said first group;

a combiner, combining at least the output of said first group and said third group to produce a divided-by signal of a reference signal; and wherein said third group has a clock offset by inverting a signal from a first path.

19. The device according to claim 12 wherein said combiner provides an XOR function.

20. An electronic data file, recorded or transmitted on a digital medium, that when loaded into an appropriately configured digital apparatus causes the apparatus to operate is in accordance with the method of claim 8.

21. An electronic data file, recorded or transmitted on a digital medium, that when loaded into an appropriately configured digital apparatus causes the apparatus to embody the system of claim 1.

22. The device according to claim 12 wherein the third group is clocked with an inverted clock signal so that the third group has a clock offset from other stages.

* * * * *